(No Model.)
L. RASTETTER.
JOINT FOR VEHICLE WHEEL RIMS.
No. 528,741. Patented Nov. 6, 1894.
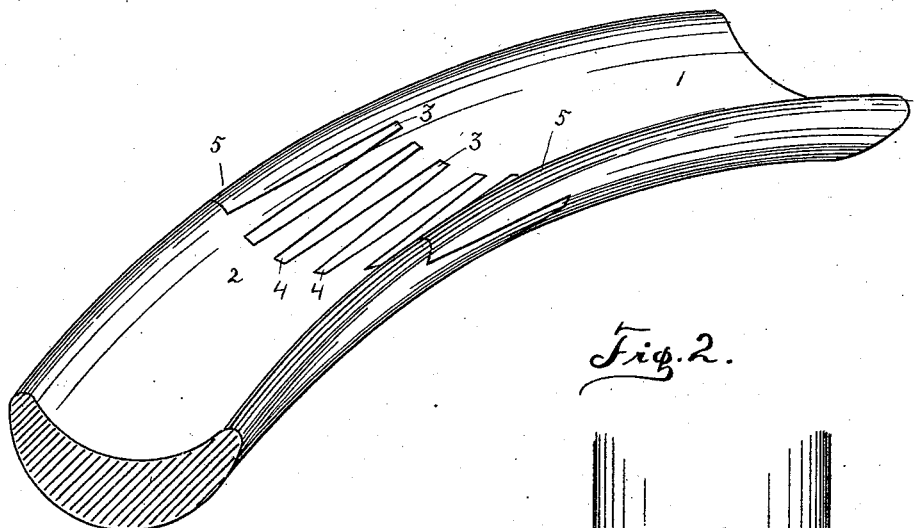
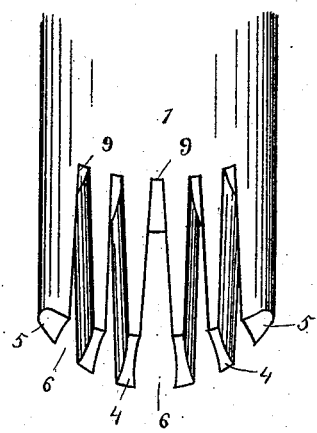
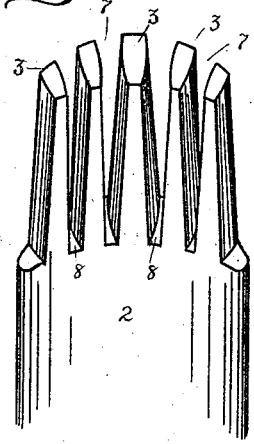
WITNESSES: Louis Rastetter INVENTOR
Walter G. Burns
G. W. Gaide
BY Chapin & Denny
his ATTORNEYS.

UNITED STATES PATENT OFFICE.

LOUIS RASTETTER, OF FORT WAYNE, INDIANA.

JOINT FOR VEHICLE-WHEEL RIMS.

SPECIFICATION forming part of Letters Patent No. 528,741, dated November 6, 1894.

Application filed July 27, 1894. Serial No. 518,690. (No model.)

*To all whom it may concern:*

Be it known that I, LOUIS RASTETTER, a citizen of the United States, residing at Fort Wayne, in the county of Allen, in the State of Indiana, have invented certain new and useful Improvements in Joints for Vehicle-Rims; and I do hereby declare that the following is a full, clear, and exact description of the invention, which will enable others skilled in the art to which it appertains to make and use the same, reference being had to the accompanying drawings, which form part of this specification.

My invention relates to improvements in rim joints for vehicle wheels, specially adapted and designed for wooden bicycle-rims.

The object of my invention is to provide an interlocking joint for wooden-rims for bicycle wheels so constructed and arranged that the interlocking parts are radial from a common center without the rim, and so united, when in position, as to be secure against either vertical or lateral displacement, without even the use of glue, the said parts being so constructed as to preserve for the rim at the joint the greatest strength possible, and having the parts so united that each registering tenon in the joint acts like the key stone in an arch, and at the same time when united they conform in all respects to the general contour of the rim.

My invention comprises an interlocking joint for the opposite ends of a wooden-rim for vehicle wheels formed by providing each of the said ends with a series of outwardly tapering tenons radial to a common center, adapted to form a close interlocking union, or deadlock, one series of the said tenons having their sides convex and adapted to register with the corresponding sides of the other series of tenons.

The novel feature of my invention consists in the construction and arrangement of the interlocking tenons whereby each of the series of convex tenons is embraced in an interlocking union by a pair of the abutting series of concave tenons in such a manner as to render the abutting ends of the rim when driven home, secure against either lateral or vertical displacement; and whereby each of the said registering tenons is wedge shaped to more fully preserve the strength of the rim at the joint, are also arch shaped and radial to a common center.

In the accompanying drawings forming part of this specification similar figures of reference indicate similar parts throughout the several views.

Figure 1 is a perspective of my improved interlocking joint, showing the relative arrangement of the registering tenons when in position. Fig. 2 is a perspective of one end of the rim provided with the concavo-concave tenons. Fig. 3 is a perspective of the other abutting and interlocking end of the said rim having the convexo-convex tenons.

The wooden-rim shown in the drawings is of the usual concavo-convex form in common use for bicycle wheels, preferably made of one piece of wood, and the abutting ends and interlocking tenons when in engagement preserve for the joint in all respects the general contour of the rim. The abutting end 1 of the said rim is provided with a series of uniformly arranged radial, longitudinal mortises 6 having concave sides, and which widen as they approach the end of the rim, their inner end 9 being only half the width of their outer end, thus forming in addition to the exterior arms 5 a series of concavo-concave tenons 4 of equal length with the said mortises 6, and which are designed to be twice as wide at their base as at their free end, and which tenons are in the form of a truncated wedge having concave sides. The other abutting end 2 of the said rim is also provided with a series of tapering tenons 3 having convex sides and adapted to register with the said mortises 6. The said end 2 is also provided with a series of mortises 7 having convex sides and adapted to receive the interlocking tenons 4. The said tenons 3 are of the same length as the tenons 4 and when in their interlocked position, in said joint, are embraced between the exterior arms 5 of the rim end 1, as seen in Fig. 1. The said tenons each and all are radial to a common center having their inner surface narrower than their outer surface and in exact conformity to their corresponding mortises. The said tenons 3 and 4 when used for the ordinary bicycle rim, are preferably about one inch in length, as this length is found to give the greatest strength of the joint consistent with a proper regard for the strength of the rim, though they may be made of greater or less length if desired. The said mortises 6 and 7 may also be made of uniform width instead of tapering or wedge shape as shown, so long as the sides of the said tenons are convex and concave as described, though the form shown and described is the preferable one.

When the convex tenons 3 are interlocked with the concave tenons 4 it is obvious they form a deadlock and that either lateral or vertical displacement will be impossible in ordinary use.

Another advantage of my construction is that in forming the joint the wedge shape of the registering tenons does not materially interfere with the glue upon the sides thereof until they are driven nearly home, and the joint is almost completed. It is also obvious that this form of joint can be readily and economically manufactured by means of a proper barrel saw, in a well understood manner, and the interlocking ends can be conveniently glued and then readily and securely united.

While my improved joint is specially adapted and designed for bicycle rims, I do not hereby limit myself to such use, as I contemplate adapting it to other vehicle rims.

Having thus described my invention and the manner in which the same is to be employed, what I claim as my invention, and desire to secure by Letters Patent, is—

1. A vehicle rim joint consisting of two interlocking ends or sections, adapted to form a locked union, as shown, and preserving the general contour of the rim, one of the said ends having a series of outwardly tapering convexo-convex tenons adapted to register with a series of corresponding mortises in the other end of the rim or abutting section, all substantially as described.

2. A joint for vehicle rims comprising two interlocking ends or sections, one of the said ends having a series of inwardly tapering longitudinal mortises 6 having concave sides, as shown, a series of concavo-concave outwardly tapering tenons 4 adapted to register with a corresponding series of mortises in the other interlocking end, and the external arms 5 for the purpose described, the other interlocking end or section having a series of outwardly tapering tenons 3 with convex sides adapted to register with the said mortises 6, and a series of mortises 7 adapted to receive the said concave tenons 4, all substantially as described.

3. In a joint for vehicle rims, the combination of one interlocking end or section having the concavo-convex arms 5 adapted to embrace the abutting end or section, a series of longitudinal mortises having concave sides, and a series of concavo-concave tenons adapted to register with a series of corresponding mortises in the abutting end or section, with another interlocking end or section having a series of tenons adapted to register with the said mortises os the other abutting end, and having a series of mortises with convex sides adapted to receive the said concavo-concave, tenons all substantially as described.

Signed by me, at Fort Wayne, Allen county, Indiana, this 25th day of July, 1894.

LOUIS RASTETTER.

Witnesses:
WM. J. LERMORT,
SIDNEY C. LUMBARD.